United States Patent
Fukunaga et al.

(10) Patent No.: US 9,544,472 B2
(45) Date of Patent: Jan. 10, 2017

(54) IMAGE READING DEVICE AND IMAGE FORMING APPARATUS PERFORMING IMAGE CORRECTION USING COLOR PATCHES ON A CURVED SURFACE

(71) Applicant: FUJI XEROX CO., LTD., Tokyo (JP)

(72) Inventors: Kazuya Fukunaga, Kanagawa (JP);
Kiyofumi Aikawa, Kanagawa (JP);
Takashi Hiramatsu, Kanagawa (JP);
Masaki Hachisuga, Kanagawa (JP);
Michio Kikuchi, Kanagawa (JP);
Hideki Moriya, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/810,238

(22) Filed: Jul. 27, 2015

(65) Prior Publication Data
US 2016/0277643 A1 Sep. 22, 2016

(30) Foreign Application Priority Data

Mar. 20, 2015 (JP) ................................. 2015-058240

(51) Int. Cl.
*H04N 1/60* (2006.01)
*H04N 1/00* (2006.01)

(52) U.S. Cl.
CPC .......... *H04N 1/6047* (2013.01); *H04N 1/0005* (2013.01); *H04N 1/00013* (2013.01); *H04N 1/00023* (2013.01); *H04N 1/00045* (2013.01); *H04N 1/00087* (2013.01); *H04N 1/00602* (2013.01); *H04N 2201/0006* (2013.01); *H04N 2201/0081* (2013.01); *H04N 2201/0082* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 9,253,336 B2 * | 2/2016 | Fukunaga | H04N 1/6044 |
| 9,264,568 B1 * | 2/2016 | Aikawa | H04N 1/00968 |
| 9,288,351 B2 * | 3/2016 | Hachisuga | H04N 1/00615 |
| 2012/0081450 A1 * | 4/2012 | Nakano | B41J 11/46 347/19 |
| 2014/0313528 A1 * | 10/2014 | Suzuki | G06K 15/027 358/1.9 |

(Continued)

FOREIGN PATENT DOCUMENTS

| | | |
|---|---|---|
| JP | H07-168412 A | 7/1995 |
| JP | 2006-352536 A | 12/2006 |

*Primary Examiner* — Barbara Reinier
(74) *Attorney, Agent, or Firm* — Oliff PLC (57) ABSTRACT

Provided is an image reading device including an irradiation section that irradiates a reading position with light, a color chart that includes plural color patches, and that is provided on a curved surface of a rotatable roller, an image capturing section that captures an image of the color chart at the reading position, and that outputs image signals which express the captured image, a correction section that corrects the image signals using a correction coefficient corresponding to the curved surface, and a calibration section that performs calibration using the image signals, which are corrected by the correction section, and representative color values of the plural color patches, the representative color values being stored in advance.

9 Claims, 8 Drawing Sheets

(56) References Cited

U.S. PATENT DOCUMENTS

| | | | | |
|---|---|---|---|---|
| 2015/0131131 A1* | 5/2015 | Fukunaga | ............ | H04N 1/6044 358/504 |
| 2016/0021268 A1* | 1/2016 | Hachisuga | ......... | H04N 1/00615 358/498 |
| 2016/0057307 A1* | 2/2016 | Aikawa | .............. | H04N 1/00968 358/474 |

\* cited by examiner

| WAVE LENGTH | SPECTRAL CHARACTERISTICS L (INTENSITY) OF LIGHT SOURCE | | SPECTRAL CHARACTERISTICS (SENSITIVITY) OF IMAGE SENSOR | | | SPECTRAL CHARACTERISTICS λ OF COLOR CHART (REFLECTANCE (%)) | | | |
|---|---|---|---|---|---|---|---|---|---|
| | LIGHT SOURCE 1 | LIGHT SOURCE 2 | R | G | B | RECTANGULAR AREA P11 (λ11) | RECTANGULAR AREA P12 (λ12) | ... | RECTANGULAR AREA Pn (λn) |
| 400 | ⋮ | ⋮ | ⋮ | ⋮ | ⋮ | ⋮ | ⋮ | ⋮ | ⋮ |
| 410 | ⋮ | ⋮ | ⋮ | ⋮ | ⋮ | ⋮ | ⋮ | ⋮ | ⋮ |
| 420 | ⋮ | ⋮ | ⋮ | ⋮ | ⋮ | ⋮ | ⋮ | ⋮ | ⋮ |
| 430 | ⋮ | ⋮ | ⋮ | ⋮ | ⋮ | ⋮ | ⋮ | ⋮ | ⋮ |
| 440 | ⋮ | ⋮ | ⋮ | ⋮ | ⋮ | ⋮ | ⋮ | ⋮ | ⋮ |
| ... | ... | ... | ... | ... | ... | ... | ... | ... | ... |
| 690 | ⋮ | ⋮ | ⋮ | ⋮ | ⋮ | ⋮ | ⋮ | ⋮ | ⋮ |
| 700 | ⋮ | ⋮ | ⋮ | ⋮ | ⋮ | ⋮ | ⋮ | ⋮ | ⋮ |

IMAGE READING DEVICE AND IMAGE FORMING APPARATUS PERFORMING IMAGE CORRECTION USING COLOR PATCHES ON A CURVED SURFACE

CROSS-REFERENCE TO RELATED APPLICATIONS

This application is based on and claims priority under 35 USC 119 from Japanese Patent Application No. 2015-058240 filed Mar. 20, 2015.

BACKGROUND

Technical Field

The present invention relates to an image reading device and an image forming apparatus.

SUMMARY

According to an aspect of the invention, there is provided an image reading device including:

an irradiation section that irradiates a reading position with light;

a color chart that includes plural color patches, and that is provided on a curved surface of a rotatable roller;

an image capturing section that captures an image of the color chart at the reading position, and that outputs image signals which express the captured image;

a correction section that corrects the image signals using a correction coefficient corresponding to the curved surface; and a calibration section that performs calibration using the image signals, which are corrected by the correction section, and representative color values of the plural color patches, the representative color values being stored in advance.

BRIEF DESCRIPTION OF THE DRAWINGS

Exemplary embodiments of the present invention will be described in detail based on the following figures, wherein.

(a) to (c) of FIG. 3 are graphs illustrating examples of the relationship between a curvature and a correction coefficient γ of a calibration roller.

(a) to (f) of FIG. 6 are graphs illustrating examples of the relationship between a curvature and correction coefficients α and β of the calibration roller.

DETAILED DESCRIPTION

First Exemplary Embodiment

Figure 1:
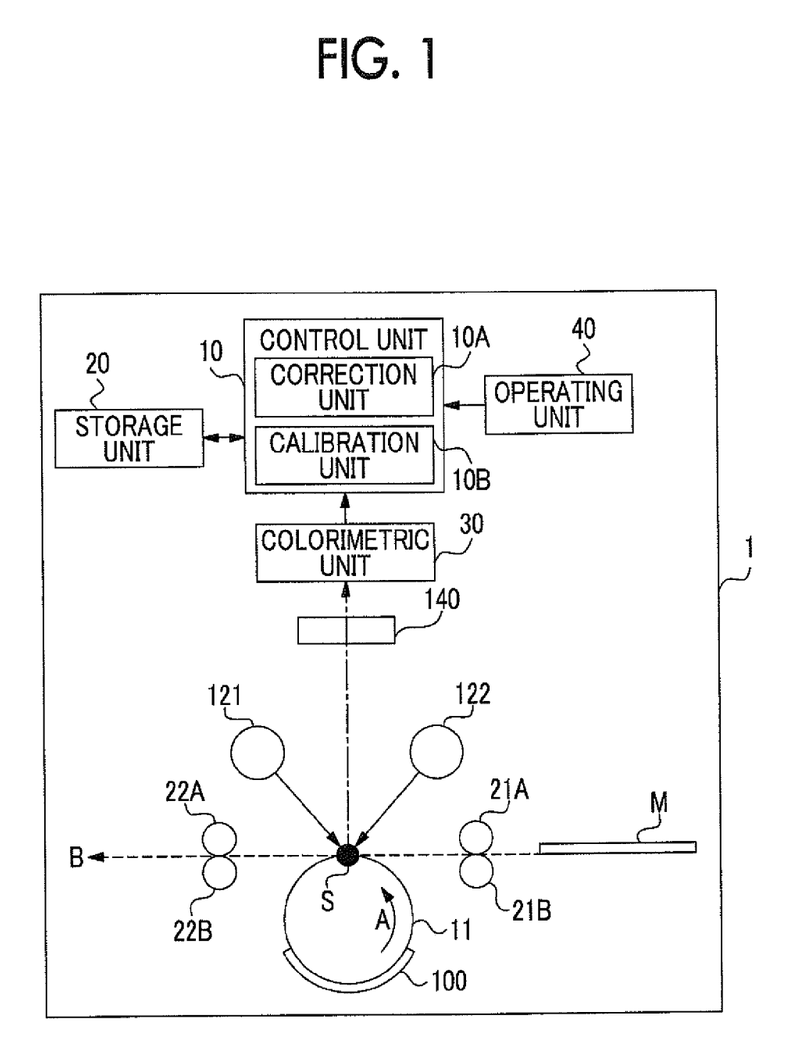
FIG. 1 is a diagram illustrating the configuration of an image reading device according to an exemplary embodiment of the present invention.

FIG. 1 is a diagram illustrating the configuration of an image reading device 1 according to an exemplary embodiment of the present invention. The image reading device 1 is a device which optically reads the surface of a recording medium M such as paper.

Feeding rollers 21A, 21B, 22A, and 22S are rollers for feeding the recording medium M. The cylindrical feeding rollers 21A and 21S are rotated by a driving section, such as a motor, which is not shown in the drawing, interpose the recording medium M which is fed between the feeding roller 21A and the feeding roller 21B, and feed the recording medium M into a reading position S. The cylindrical feeding rollers 22A and 22B are rotated by the driving section, such as a motor, which is not shown in the drawing, interpose the recording medium M which passes through the reading position S and then is fed between the feeding roller 22A and the feeding roller 22B, and feed the recording medium M in the direction of an arrow B.

A calibration roller 11 is a cylindrical member, and includes a color chart 100 for calibrating the image reading device 1 on the surface (on the side surface of a cylinder) thereof. The calibration roller 11 is rotated in the direction of an arrow A by the driving section, such as a motor, which is not shown in the drawing. When the image reading device 1 is calibrated, the calibration roller 11 rotates, and the color chart 100 is moved to the reading position S. In addition, when the image reading device 1 reads the surface of the recording medium M, the calibration roller 11 rotates, and a part of the calibration roller 11, which is not provided with the color chart 100, is positioned at the reading position S, as illustrated in FIG. 1. When the recording medium M is positioned at the reading position S, the color chart 100 is not positioned at the reading position S, and thus there are no cases in which the recording medium M comes into contact with the color chart 100 and the color chart 100 becomes damaged.

Figure 2:
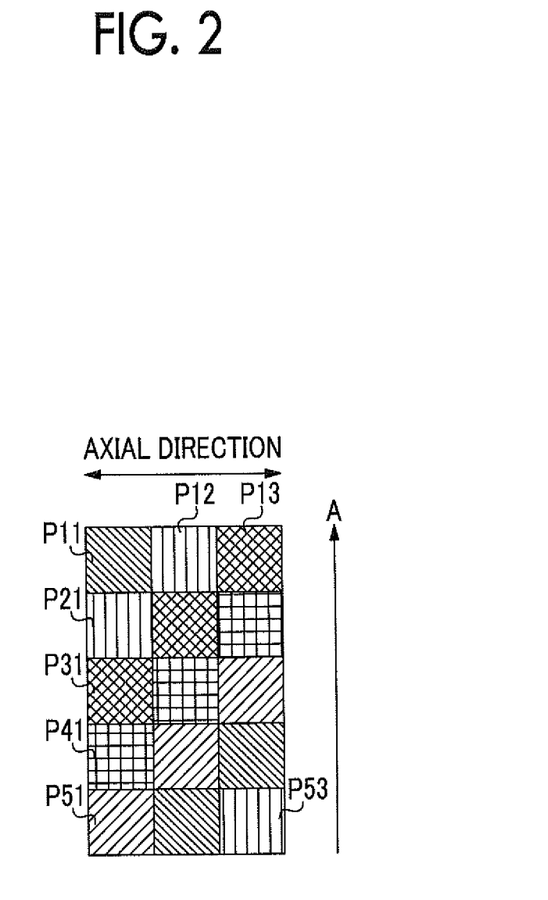
FIG. 2 is a diagram illustrating an example of a color chart.

FIG. 2 is a diagram illustrating an example of the color chart 100. FIG. 2 illustrates a flat state before the color chart 100 is arranged in the calibration roller 11. The color chart 100 includes plural rectangular areas (patches), and each of the rectangular areas displays a predetermined color. The calibration roller 11 may be formed by wrapping the roller in a sheet, on which predetermined colors are printed, as the color chart 100, or may be formed by coloring the surface of the roller with predetermined colors. The rectangular areas are arranged in plural rows in the axial direction of the calibration roller 11, and are arranged in plural columns in the circumferential direction of the calibration roller 11. In the present exemplary embodiment, the rectangular areas are arranged by 5 rows and 3 columns. However, the arrangement of the rectangular areas is not limited to the example illustrated in FIG. 2, and a configuration may be provided in which a larger number of rectangular areas are provided than the example illustrated in FIG. 2. In addition, the shape of each of the patches is not limited to the rectangle, and, for example, a circle, a polygon, or another arbitrary shape may be provided.

Each of a light source 121 or 122 is an example of an irradiation section that includes, for example, light emitting elements and a light guiding member which guides light, and that irradiates the reading position S with light. The light emitting elements include, for example, a white Light Emitting Diode (LED). However, the light emitting elements are not limited to the white LED, and may be light emitting elements that emit light which includes the three primary colors of R (Red), G (Green), and B (Blue). Each of the light source 121 or 122 converts light, which is emitted by the light emitting elements, into light having a longitudinal direction in the axial direction of the calibration roller 11, using the light guiding member, and irradiates the reading position S with the light.

An optical system 140 includes optical components such as lenses, and forms a light image, which is irradiated from the light source 121 or 122 and reflected in the recording medium M or the color chart 100 on the reading position S, on sensors which are included in a colorimetric unit 30.

The colorimetric unit 30 includes image sensors. The image sensors may be image sensors which acquire an image one-dimensionally or image sensors which acquire an image two-dimensionally. It is possible to use various sensors, such as a CCD and a COMS, as the image sensors. The colorimetric unit 30 converts light, which is formed by the image sensors by the optical system 140, into electrical signals through photoelectric conversion, and generates an image signal R corresponding to R (Red) light, an image signal G corresponding to G (Green) light, and an image signal B corresponding to B (Blue) light. The colorimetric unit 30 outputs the generated image signals to a control unit 10. The colorimetric unit 30 is an example of an imaging section which images the reading position S.

An operating unit 40 includes plural buttons for operating the image reading device 1. The control unit 10 includes a Central Processing Unit (CPU), a Read Only Memory (ROM), and a Random Access Memory (RAM). When a program which is stored in the ROM is executed by the CPU, the control unit 10 controls each of the units of the image reading device 1. When the CPU executes the program which is stored in the ROM, a correction unit 10A, which is an example of a correction section, and a calibration unit 10B, which is an example of a calibration section, are implemented. The control unit 10 performs a scanning process of reading the surface of the recording medium M and generating image data indicative of a read image or a calibration process of calibrating the image reading device 1 according to an operation which is operated by the operating unit 40.

The scanning process is a process of generating the image data indicative of the read image based on the image signals which are acquired by the colorimetric unit 30 when the surface of the recording medium M is read. The control unit 10 generates an image, in which the image signal R, the image signal G, and the image signal B are expressed by representative color values in a predetermined color space (for example, CIELAB color space), using a transformation matrix which determines the relationship between the values of the image signals and the representative color values of colors indicated by the respective image signals, and stores image data, which expresses the generated image, in a storage unit 20. When conversion is performed from the values of the image signals into the representative color values, conversion is performed on the average value of the values of pixels including a target pixel in a predetermined range using the transformation matrix.

The calibration process is a process of calibrating the transformation matrix which is used for one scanning process based on the image signals which are acquired when the color chart 100 is read. The image reading device 1 rotates the calibration roller 11 in the direction of the arrow A, and sequentially reads the plural rectangular areas which are arranged in the color chart 100 in the circumferential direction.

The color of each of the rectangular areas of the color chart 100 is precisely measured in advance in a flat shape using a spectral colorimetric machine, and measured color values are known. The measured color values are expressed using representative color values in the CIELAB color space which is defined by, for example, a component relevant to lightness L*, a component a* relevant to hue, and a component b* relevant to saturation. The CIELAB color space is an example of a color space which is independent from the device, and is used to evaluate color reproducibility.

The known measured color values are stored in the storage unit 20 in advance as the true values of the representative color values of the rectangular area. In the calibration process, the control unit 10 acquires the transformation matrix for performing conversion on the image signal which is output by the colorimetric unit 30 such that the representative color values, which are acquired based on the image signals when the color chart 100 is read, become the stored true values.

The storage unit 20 includes a device (for example, a hard disk drive) which permanently stores data, and stores the image data, which is generated by the control unit 10, and various data which is used when the calibration process is performed. For example, the storage unit 20 stores the above-described transformation matrix, the true values of the representative color values of each of the rectangular areas of the color chart 100 which are measured using the spectral colorimetric machine, the correction coefficient γ which corrects each of the image signals which are output from the colorimetric unit 30, and the like.

Here, the correction coefficient γ will be described. When the color chart 100 is precisely measured using the spectral colorimetric machine or the like, the measurement is performed when the color chart 100 is in a flat state. In contrast, when the color of the color chart 100 is measured in the calibration process, the color chart 100 has a curved surface along the side surface of the calibration roller 11.

When a measurement target is a curved surface, the quantity of light, which reaches the calorimetric unit 30 from the reading position S, is reduced as the radius of the calibration roller 11 is short, compared to a case in which the measurement target is a flat surface. Therefore, when the color chart 100, which is adhered to the calibration roller 11, is measured, the values of the image signals of the respective rectangular areas, which are acquired by the calorimetric unit 30, are different from values which are measured in a flat state.

Further, when the transformation matrix is acquired based on the state in which the measurement target is a curved surface as described above, the values of the image signals are different from values, which are acquired when the calibration process is performed, even when, for example, the same color as in the color chart 100 is on the recording medium M in the scanning process, and thus the representative color value which is acquired using the transformation matrix becomes a representative color value which is different from an actual representative color value.

Here, in the present exemplary embodiment, when the calibration process is performed, a correction coefficient γr for correcting the reduced quantity of light R, a correction coefficient γg for correcting the reduced quantity of light G, and a correction coefficient γb for correcting the reduced quantity of light B are stored.

Figure 3:
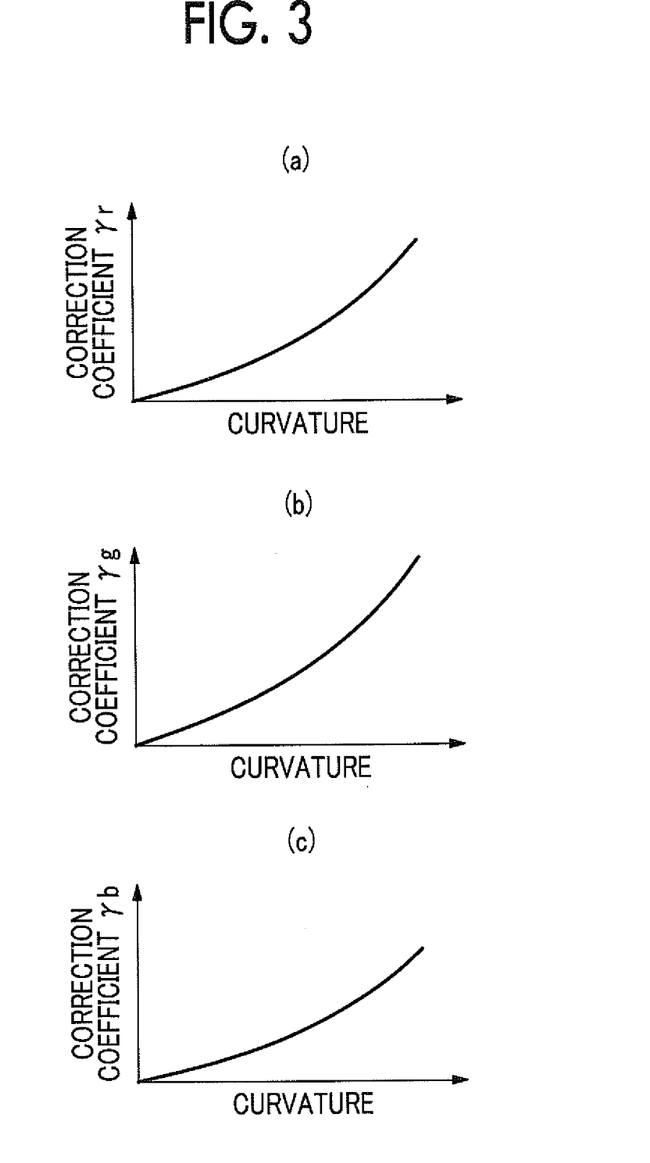

(a) to (c) of FIG. 3 are graphs illustrating examples of the relationship between the curvature and the correction coefficient γ of the calibration roller 11 with regard to the rectangular area which is present in the color chart 100. As illustrated in (a) to (c) of FIG. 3, the correction coefficient becomes large as the curvature becomes large (that is, as the radius of the calibration roller 11 becomes small), and the value thereof differs for each of R, G, and B colors. The storage unit 20 stores the correction coefficient γr, the correction coefficient γg, and the correction coefficient γb corresponding to the curvature of the calibration roller 11 for each of the rectangular areas of the color chart 100.

Subsequently, an example of an operation when the calibration process is performed will be described. Meanwhile, in the description below, an example of an operation will be described with the assumption that the width of light, in which the color chart 100 is irradiated at the reading position S, in the direction of the arrow A is narrower than the width of one rectangular area of the color chart 100 in the direction of the arrow A.

Figure 4:
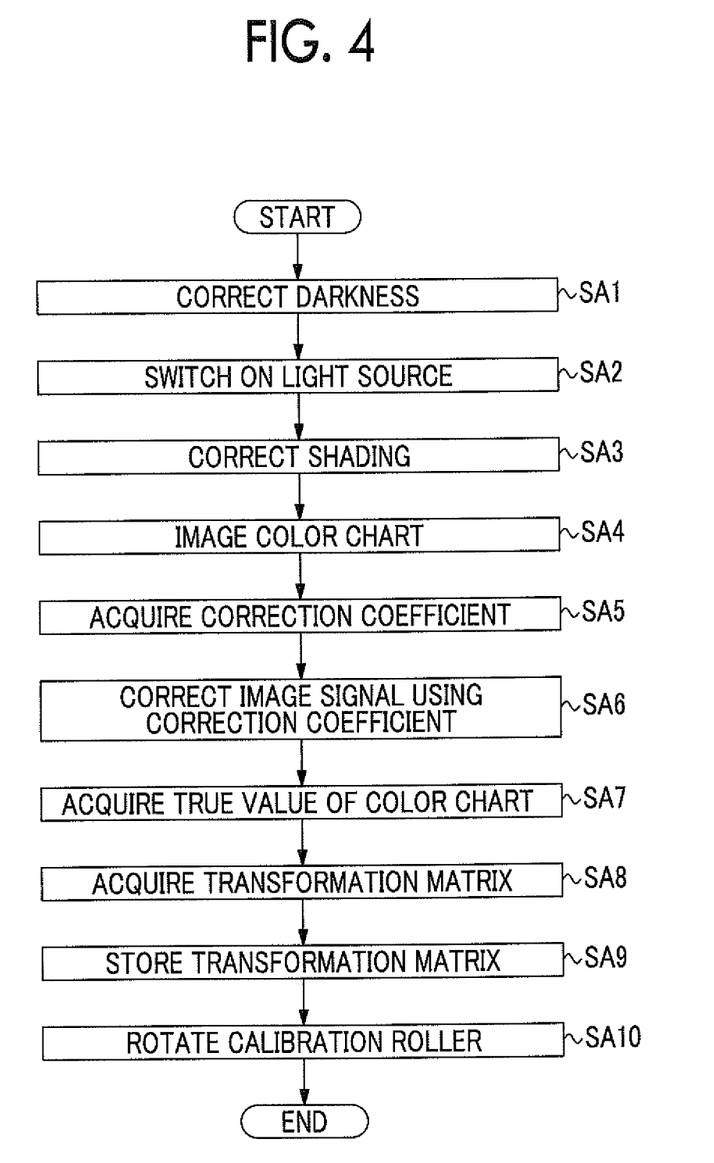
FIG. 4 is a flowchart illustrating the flow of a calibration process according to a first exemplary embodiment.

FIG. 4 is a flowchart illustrating the flow of a process when the image reading device 1 performs the calibration process. When an operation of instructing to execute the calibration process is performed by the operating unit 40, the control unit 10 first performs darkness correction by switching off the light sources 121 and 122 (step SA1). Subsequently, the control unit 10 switches on the light sources 121 and 122 (step SA2), and performs shading correction (step SA3).

When the shading correction ends, the control unit 10 images the color chart 100 (step SA4). When the control unit 10 images the color chart 100, the control unit 10 images the color chart 100 by controlling the colorimetric unit 30 while rotating the calibration roller 11 using the driving section, which is not shown in the drawing. The colorimetric unit 30 outputs the image signal R, the image signal G, and the image signal B to the control unit 10 according to an image which is formed by the optical system 140. Further, the control unit 10 converts the image signals which are supplied from the colorimetric unit 30 into digital signals, and stores the digital signals in the storage unit 20. Therefore, with regard to each of the rectangular areas of the color chart 100, the respective value of the image signal R, the image signal G, and the image signal B are stored. The control unit 10 calculates the representative values of the image signal R, the image signal G, and the image signal B of each rectangular area. When the representative values are calculated, an average value of a predetermined area which is smaller than the rectangular area is calculated for each of the image signals from the rectangular area. The predetermined area may be a rectangle. However, the predetermined area is not limited to the rectangle, and, an arbitrary shape, for example, a circle, a polygon, or the like may be determined for the predetermined area.

When the imaging of the color chart 100 ends, the control unit 10 acquires the correction coefficient γr, the correction coefficient γg and the correction coefficient γb which are stored in the storage unit 20 (step SA5). When the control unit 10 (correction unit 10A) acquires the correction coefficient γr, the correction coefficient γg and the correction coefficient γb, the control unit 10 corrects the representative values of the stored image signal R, the image signal G and the image signal B of each of the rectangular areas using the acquired correction coefficients (step SA6). More specifically, the control unit 10 adds the correction coefficient γr, the correction coefficient γg, and the correction coefficient γb, which correspond to each of the respective rectangular areas, to the representative values of the stored image signal R, the image signal G and the image signal B of each of the rectangular areas.

For example, when a correction coefficient $\gamma r_{11}$, a correction coefficient $\gamma g_{11}$, and a correction coefficient $\gamma b_{11}$, which correspond to a rectangular area P11 illustrated in FIG. 2, are stored, the correction coefficient $\gamma r_{11}$ is added to the representative value of the image signal R of the rectangular area P11, the correction coefficient $\gamma g_{11}$ is added to the representative value of the image signal G of the rectangular area P11, and the correction coefficient $\gamma b_{11}$ is added to the representative value of the image signal B of the rectangular area P11. In addition, when a correction coefficient $\gamma r_{12}$, a correction coefficient $\gamma g_{12}$, and a correction coefficient $\gamma b_{12}$, which correspond to a rectangular area P12, are stored, the correction coefficient $\gamma r_{12}$ is added to the representative value of the image signal R of the rectangular area P12, the correction coefficient $\gamma g_{12}$ is added to the representative value of the image signal G of the rectangular area P12, and the correction coefficient $\gamma b_{12}$ is added to the representative value of the image signal B of the rectangular area P12. Therefore, the stored image signals are corrected using the image signals which are acquired when the color chart 100 is imaged in the flat state.

Subsequently, the control unit 10 (calibration unit 10B) acquires the true values of the representative color values of each rectangular area of the color chart 100 from the storage unit 20 (step SA7), and acquires a transformation matrix A which is used to convert the image signals into representative color values in the CIELAB color space using the acquired true values (step SA8).

For example, in a case of the color chart 100 which is illustrated in FIG. 2, the relationship between the true values of the representative color values of each rectangular area and the image signals is as expressed in Expression 1. Meanwhile, in the equation of Expression 1, $L^*_{11}$ to $L^*_{53}$ are true values of $L^*$ of the rectangular areas P11 to P53 which are acquired from the storage unit 20, $a^*_{11}$ to $a^*_{53}$ are true values of $a^*$ of the rectangular areas P11 to P53 which are acquired from the storage unit 20, and $b^*_{11}$ to $b^*_{53}$ are values of $b^*$ of the rectangular areas P11 to P53 which are acquired from the storage unit 20. In addition, $R_{11}$ to $R_{53}$ are representative values of the image signals R of the rectangular areas P11 to P53 acquired after correction is performed in step SA6, $G_{11}$ to $G_{53}$ are representative values of the image signals G of the rectangular areas P11 to P53 acquired after correction is performed in step SA6, and $B_{11}$ to $B_{53}$ are representative values of the image signals B of the rectangular areas P11 to P53 acquired after correction is performed in step SA6. When each of the matrixes of Expression 1 is expressed as L=AD, matrix A (transformation matrix) is acquired using a general least-squares method.

$$\begin{pmatrix} L^*_{11} & \cdots & L^*_{53} \\ a^*_{11} & \cdots & a^*_{53} \\ b^*_{11} & \cdots & b^*_{53} \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \end{pmatrix} \begin{pmatrix} R_{11} & \cdots & R_{53} \\ G_{11} & \cdots & G_{53} \\ B_{11} & \cdots & B_{53} \\ 1 & \cdots & 1 \end{pmatrix} \quad \text{Expression 1}$$

When the transformation matrix A is acquired, the control unit 10 stores the acquired transformation matrix A in the storage unit 20 (step SA9). When the process in step SA9 ends, the control unit 10 rotates the calibration roller 11 using the driving section, which is not shown in the drawing, (step SA10) such that a part in which the color chart 100 is not provided is positioned at the reading position S. Thereafter, the calibration process ends.

When the scanning process is performed, the control unit 10 converts the image signal R, the image signal G, and the image signal B, which are supplied from the colorimetric unit 30, into the representative color values of the CIELAB color space using the transformation matrix A, which is acquired in step SA8, as shown in Expression 2.

$$\begin{pmatrix} L^* \\ a^* \\ b^* \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \end{pmatrix} \begin{pmatrix} R \\ G \\ B \\ 1 \end{pmatrix}$$ Expression 2

According to the present exemplary embodiment, after the color chart 100 is measured, image signals which are acquired through the measurement are corrected according to the curvatures of the calibration roller 11, thereby calculating a transformation matrix in which the difference, acquired when the calibration process is performed on the color chart 100 in a flat state, is small.

Meanwhile, in the above-described exemplary embodiment, the transformation matrix A is a 3-row×4-column transformation matrix. However, the transformation matrix A may be a transformation matrix which has higher-order terms as expressed in Expression 3. In the calibration process, a 3-row×9-column transformation matrix may be acquired as expressed in Expression 3. In addition, a 3-row× 10-column transformation matrix may be used by adding a constant term.

$$\begin{pmatrix} L^* \\ a^* \\ b^* \end{pmatrix} = \begin{pmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{pmatrix} \begin{pmatrix} R \\ G \\ B \\ RG \\ GB \\ BR \\ R^2 \\ G^2 \\ B^2 \end{pmatrix}$$ Expression 3

Second Exemplary Embodiment

Subsequently, a second exemplary embodiment of the present invention will be described. In the image reading device 1 according to the second exemplary embodiment, the width of light, with which the color chart 100 is irradiated at the reading position S, in the direction of the arrow A, data which is stored in the storage unit 20, a process which is performed in the calibration process, and the like are different from those of the first exemplary embodiment. In the description below, the same reference numerals are used for the same components in the first exemplary embodiment, with the result that the descriptions thereof are not repeated, and thus description will be made based on the difference between the second exemplary embodiment and the first exemplary embodiment.

Figure 5:
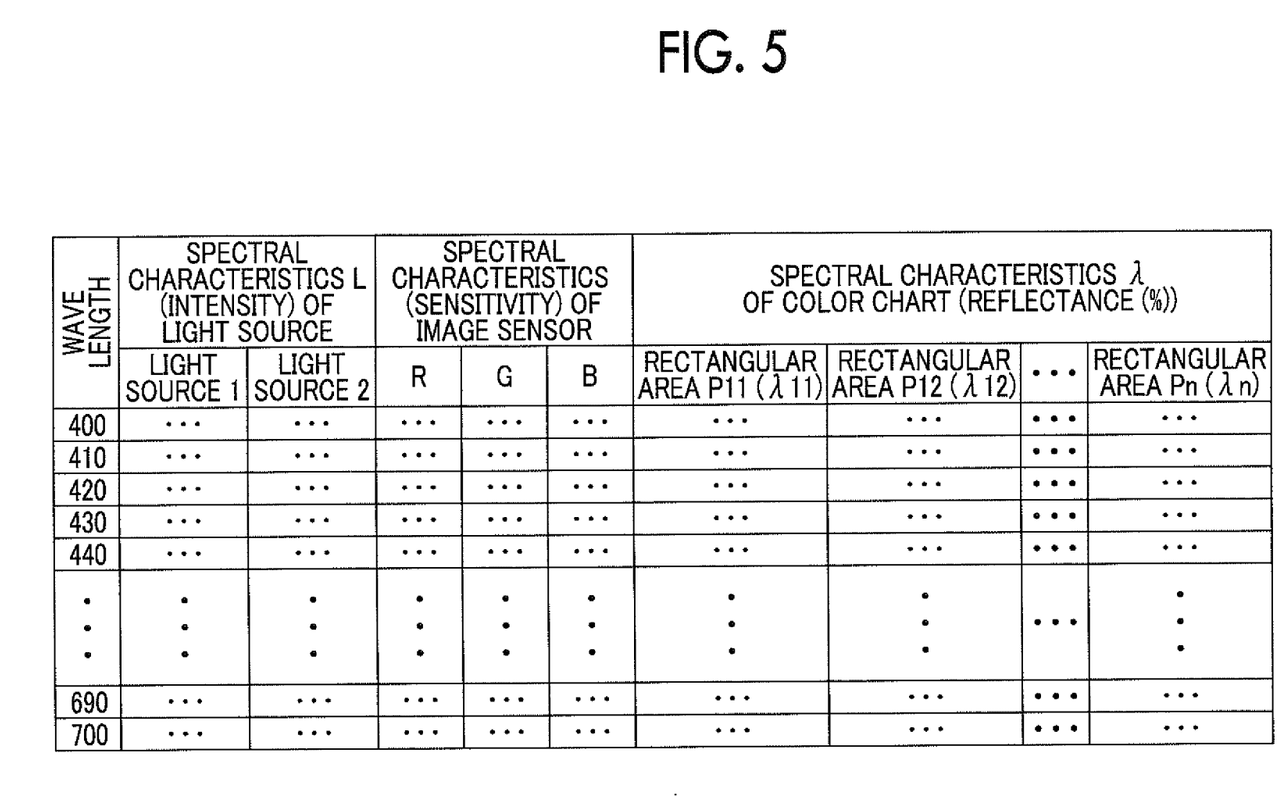
FIG. 5 is a table illustrating an example of spectral characteristics which are stored in a storage unit.

The storage unit 20 according to the second exemplary embodiment stores the spectral characteristics L of the light sources 121 and 122, the spectral characteristics of the image sensors of the colorimetric unit 30, and the spectral characteristics of the respective rectangular areas of the color chart 100 in addition to the data which is stored in the first exemplary embodiment. FIG. 5 is a table illustrating an example of spectral characteristics which are stored in the storage unit 20. As illustrated in FIG. 5, the storage unit 20 stores the spectral characteristics of the light sources 121 and 122, the spectral characteristics of the respective image sensors of R (Red), G (Green), and B (Blue), and the spectral characteristics of the respective rectangular areas of the color chart 100 for every wavelength of 10 nm. The spectral characteristics of the respective rectangular areas are stored as one spectral characteristic by superimposing the spectral characteristics of black, cyan, yellow, and magenta.

In addition, the storage unit 20 stores a correction coefficient α and a correction coefficient β for correcting each of the image signals which are output from the colorimetric unit 30.

Here, the correction coefficient α and the correction coefficient β will be described. Similarly to the first exemplary embodiment, when the color of the color chart 100 is measured in the calibration process, the color chart 100 has a curved surface along the side surface of the calibration roller 11.

For example, a case is assumed in which the rectangular area P12, which is illustrated in FIG. 2, is read. In the present exemplary embodiment, the rectangular area P11 and the rectangular area P13 are also irradiated with light which is irradiated from the light sources 121 and 122, and thus light, which is reflected on the rectangular area P11 that is a curved surface, and light, which is reflected on the rectangular area P13 that is a curved surface, are incident into the colorimetric unit 30. Therefore, the values of the image signals of each of the rectangular areas which are acquired by the colorimetric unit 30 are different from values acquired when only the rectangular area P12 is irradiated with light in the flat state.

Further, when the transformation matrix is acquired based on a state as above, the values of the image signals are different from values which are acquired by performing the calibration process even though the same color as the color chart 100 is on the recording medium M in the scanning process, and thus the representative color values which are acquired using the transformation matrix become representative color values which are different from actual representative color values.

Here, in the present exemplary embodiment, for each rectangular area of the color chart 100, a correction coefficient αr for correcting the quantity of light R, a correction coefficient αg for correcting the quantity of light G, and a correction coefficient αb for correcting the quantity of light B are stored, the light being reflected in adjacent rectangular areas in the direction of the arrow A when viewed from the reading position S. Further, a correction coefficient βr for correcting the quantity of light R, a correction coefficient βg for correcting the quantity of light G, and a correction coefficient βb for correcting the quantity of light B are stored, the light being reflected in adjacent rectangular areas in the direction opposite to the direction of the arrow A when viewed from the reading position S.

Figure 6:
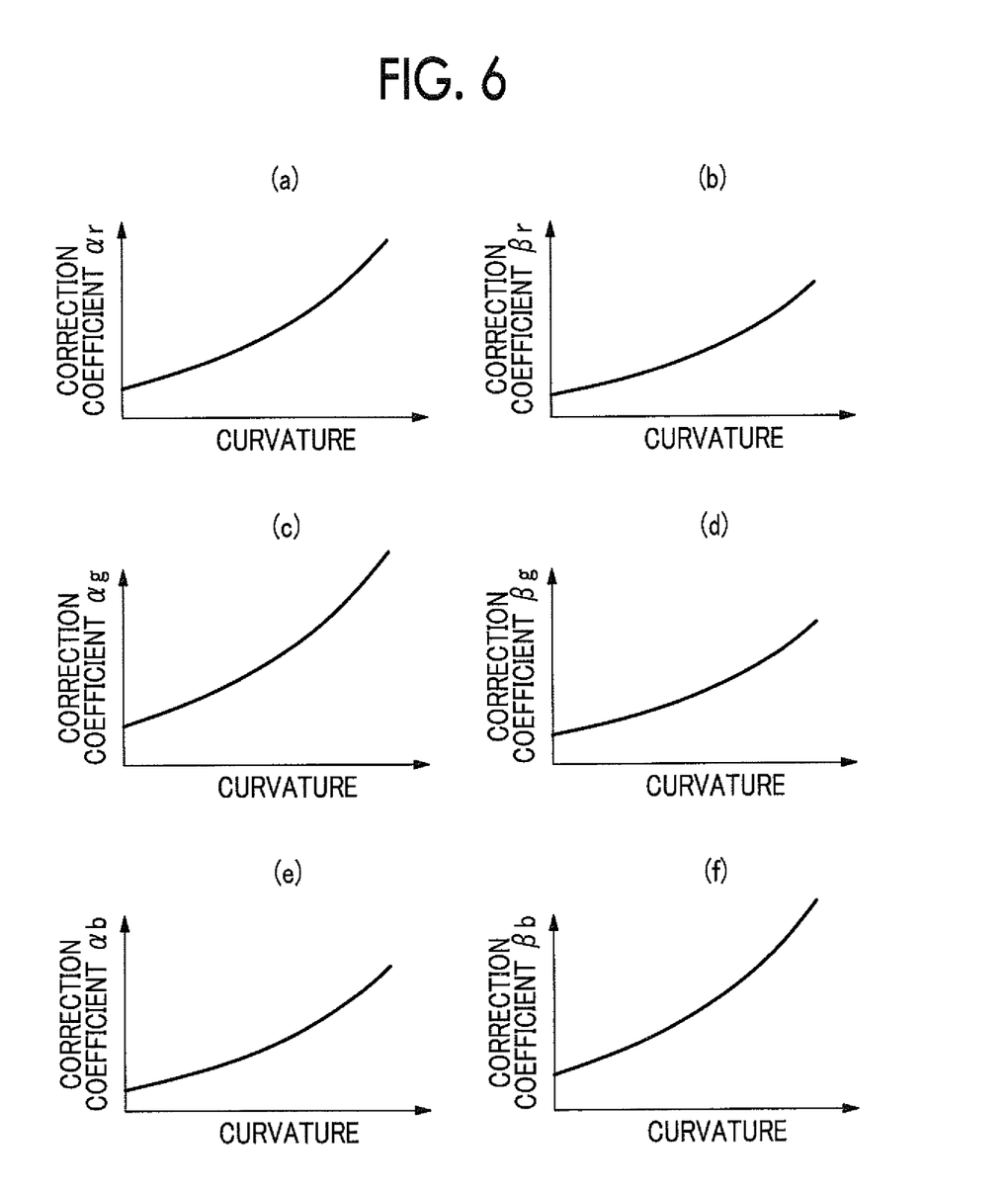

(a) to (f) of FIG. 6 are graphs illustrating examples of the relationship between the curvature of the calibration roller 11 and a correction coefficient α and the relationship between the curvature of the calibration roller 11 and the correction coefficient β with regard to the rectangular area P12. As illustrated in FIG. 6, the correction coefficient has a large value as the curvature becomes large (that is, as the radius of the calibration roller 11 becomes small), and the values differ for the respective colors R, G, and B. The storage unit 20 stores the correction coefficient αr, the correction coefficient αg, the correction coefficient αb, the correction coefficient βr, the correction coefficient βg, and the correction coefficient βb which correspond to the curvature of the calibration roller 11 for each of the rectangular areas of the color chart 100.

Figure 7:
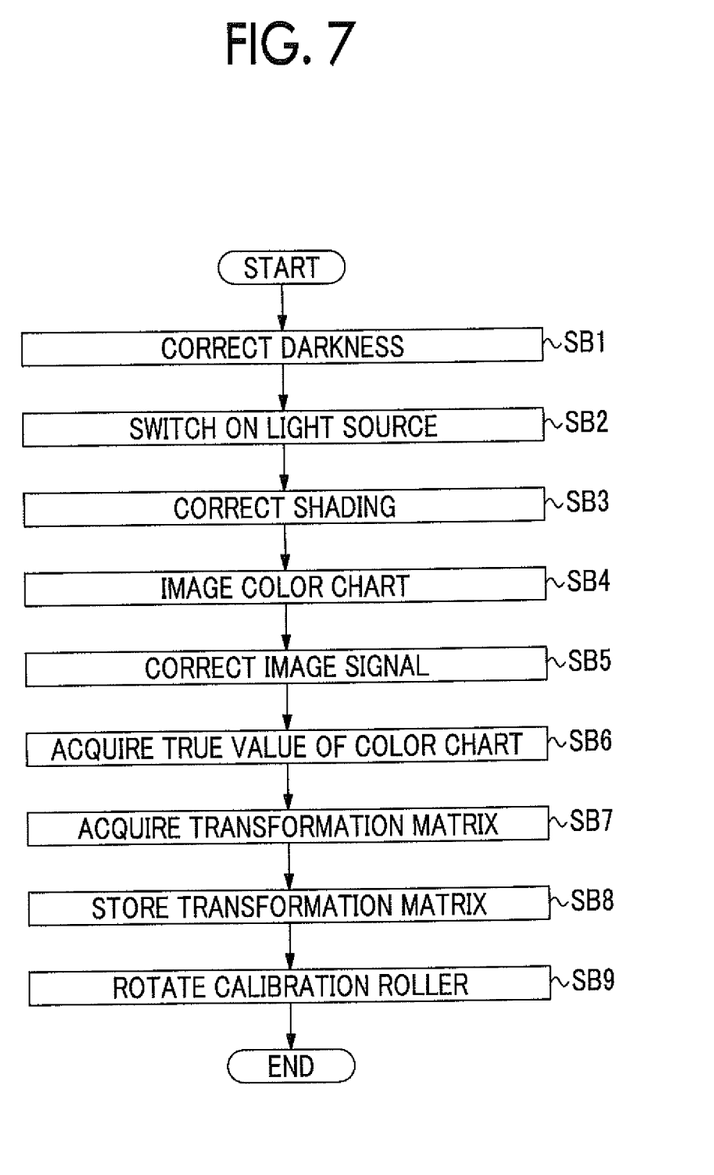
FIG. 7 is a flowchart illustrating the flow of a calibration process according to a second exemplary embodiment.

Subsequently, an example of an operation, performed when the image reading device 1 according to the second exemplary embodiment performs the calibration process, will be described. FIG. 7 is a flowchart illustrating the flow of a process performed when the image reading device 1 according to the second exemplary embodiment performs the calibration process. Meanwhile, processes in step SB1 to step SB4 are the same as the processes in step SA1 to step SA4, and the description thereof will not be repeated.

When the imaging of the color chart 100 ends, the control unit 10 corrects the stored representative values of the image signal R, the image signal G, and the image signal B of each of the rectangular areas (step SB5).

For example, when the representative values of the respective image signals of a rectangular area P21 illustrated in FIG. 2 are corrected and when it is assumed that an image signal R which is acquired after correction is an image signal $NR_{21}$, an image signal G which is acquired after correction is an image signal $NG_{21}$, and an image signal B which is acquired after correction is an image signal $NB_{21}$, the values of the respective image signals acquired after correction are calculated using Equations (1) to (3).

$$\text{Image signal } NR_{21}=R_{21}-\alpha r_{11}*R_{11}-\beta r_{31}*R_{31}+\gamma r_{21} \quad (1)$$

$$\text{Image signal } NG_{21}=G_{21}-\alpha g_{11}*G_{11}-\beta g_{31}*G_{31}+\gamma g_{21} \quad (2)$$

$$\text{Image signal } NB_{21}=B_{21}-\alpha b_{11}*B_{11}-\beta b_{31}*B_{31}+\gamma b_{21} \quad (3)$$

$R_{21}$ is a value which is acquired before the correction of the image signal R of the rectangular area P21, $G_{21}$ is a value which is acquired before the correction of the image signal G of the rectangular area P21, and $B_{21}$ is a value which is acquired before the correction of the image signal B of the rectangular area P21.

$R_{11}$ is a value which indicates the component of red light reflected in the rectangular area P11, $G_{11}$ is a value which indicates the component of green light reflected in the rectangular area P11, $B_{11}$ is a value which indicates the component of blue light reflected in the rectangular area P11, and $R_{11}$, $G_{11}$ and $B_{11}$ are acquired using Equations (4) to (6). Here, $R_{11}$ is a value which is acquired by integrating or multiplying total spectral characteristics, which are acquired by multiplying the spectral characteristics of the respective light sources, patches, and sensors, to wavelengths. $G_{11}$ and $B_{11}$ are acquired in the same manner as $R_{11}$.

$R_{11}$=the spectral characteristic L of the light source*the spectral characteristic λ11 of the rectangular area P11*the spectral characteristic of R of the calorimetric unit 30 (4)

$G_{11}$=the spectral characteristic L of the light source*the spectral characteristic λ11 of the rectangular area P11*the spectral characteristic of G of the calorimetric unit 30 (5)

$B_{11}$=the spectral characteristic L of the light source*the spectral characteristic λ11 of the rectangular area P11*the spectral characteristic of B of the calorimetric unit 30 (6)

$R_{31}$ is a value which indicates the component of red light reflected in the rectangular area P31, $G_{31}$ is a value which indicates the component of green light reflected in the rectangular area P31, $B_{31}$ is a value which indicates the component of blue light reflected in the rectangular area P31, and $R_{31}$, $G_{31}$ and $B_{31}$ are acquired using Equations (7) to (9).

$R_{31}$=the spectral characteristic L of the light source*the spectral characteristic λ31 of the rectangular area P31*the spectral characteristic of R of the calorimetric unit 30 (7)

$G_{31}$=the spectral characteristic L of the light source*the spectral characteristic λ31 of the rectangular area P31*the spectral characteristic of G of the calorimetric unit 30 (8)

$B_{31}$=the spectral characteristic L of the light source*the spectral characteristic λ31 of the rectangular area P31*the spectral characteristic of B of the colorimetric unit 30 (9)

Meanwhile, with regard to the spectral characteristic L of the light source, the average value of the values of the light source 121 and the light source 122 may be used.

The control unit 10 acquires the characteristics and coefficients, which are used for calculations, from the storage unit 20. Further, with regard to another rectangular area, the control unit 10 corrects the representative values of the image signal R, the image signal G, and the image signal B of each of the rectangular areas using the spectral characteristics and the correction coefficients of adjacent rectangular areas.

Subsequently, the control unit 10 acquires the true values of the representative color values of each of the rectangular areas of the color chart 100 from the storage unit 20 (step SB6), and acquires a transformation matrix A, which is used to convert image signals output by the colorimetric unit 30 into the representative color values of the CIELAB color space, using the acquired true values (step SB7). When the transformation matrix A is acquired, the control unit 10 stores the acquired transformation matrix A in the storage unit 20 (step SB8). When the process in step SB8 ends, the control unit 10 rotates the calibration roller 11 using the driving section, which is not shown in the drawing, such that a part in which the color chart 100 is not provided is positioned at the reading position S (step SB9), and then ends the calibration process.

In the present exemplary embodiment, after the color chart 100 is measured, the image signals which are acquired through measurement are corrected according to the curvature of the calibration roller 11, thereby calculating a transformation matrix, which has a small difference from a transformation matrix acquired when the calibration process is performed while the color chart 100 is in the flat state.

Meanwhile, in the above-described second exemplary embodiment, a configuration, in which three rectangular areas of the color chart 100 in the direction of the arrow A are irradiated with light from the light sources 121 and 122, is provided. However, a configuration, in which five rectangular areas centering on the reading position S are irradiated with light from the light sources 121 and 122 in the direction of the arrow A, may be provided. In a case of the configuration, for example, when the image signals of the rectangular area P31 are corrected, the quantity of light which is reflected in the rectangular area P11 and the rectangular area P51 may be corrected according to the spectral characteristics and the correction coefficients, in addition to the rectangular area P21 and the rectangular area P41.

For example, when the representative values of the respective image signals of the rectangular area P31 illustrated in FIG. 2 are corrected and when it is assumed that an image signal R acquired after the correction is an image signal $NR_{31}$, an image signal G acquired after the correction is an image signal $NG_{31}$ and an image signal B acquired after the correction is an image signal $NB_{31}$, the values of the respective image signals acquired after the correction are calculated using Equations (10) to (12).

$$\text{Image signal } NR_{31} = R_{31} - \alpha r_{21}*R_{21} - \beta r_{41}*R_{41} - \chi r_{11}*R_{11} - \kappa r_{51}*R_{51} + \gamma r_{31} \quad (10)$$

$$\text{Image signal } NG_{31} = G_{31} - \alpha g_{21}*G_{21} - \beta g_{41}*G_{41} - \chi g_{11}*G_{11} - \kappa g_{51}*G_{51} + \gamma g_{31} \quad (11)$$

$$\text{Image signal } NB_{31} = B_{31} - \alpha b_{21}*B_{21} - \beta b_{41}*B_{41} - \chi b_{11}*B_{11} - \kappa b_{51}*B_{51} + \gamma b_{31} \quad (12)$$

$R_{31}$ is a value acquired before the correction of the image signal R of the rectangular area P31, $G_{31}$ is a value acquired before the correction of the image signal G of the rectangular area P31, and $B_{31}$ is a value acquired before the correction of the image signal B of the rectangular area P31.

Correction coefficients $\chi r$, $\chi g$, and $\chi b$ are correction coefficients for correcting the quantity of light which is reflected in the rectangular area P11, and correction coefficients $\kappa r$, $\kappa g$, and $\kappa b$ are correction coefficients for correcting the quantity of light which is reflected in the rectangular area P51.

$R_{21}$ is a value which indicates the component of red light which is reflected in the rectangular area 221, $G_{21}$ is a value which indicates the component of green light which is reflected in the rectangular area P21, and $B_{21}$ is a value which indicates the component of blue light which is reflected in the rectangular area P21. $R_{21}$, $G_{21}$, and $B_{21}$ are acquired using Equations (13) to (15).

$R_{21}$=the spectral characteristic $L$ of the light source*spectral characteristic $\lambda 21$ of the rectangular area $P21$*the spectral characteristic of $R$ of the colorimetric unit 30 (13)

$G_{21}$=the spectral characteristic $L$ of the light source*spectral characteristic $\lambda 21$ of the rectangular area $P21$*the spectral characteristic of $G$ of the calorimetric unit 30 (14)

$B_{21}$=the spectral characteristic $L$ of the light source*spectral characteristic $\lambda 21$ of the rectangular area $P21$*the spectral characteristic of $B$ of the colorimetric unit 30 (15)

$R_{41}$ is a value which indicates the component of red light which is reflected in the rectangular area P41, $G_{41}$ is a value which indicates the component of green light which is reflected in the rectangular area P41, and $B_{41}$ is a value which indicates the component of blue light which is reflected in the rectangular area P41. $R_{41}$, $G_{41}$, and $B_{41}$ are acquired using Equations (16) to (18).

$R_{41}$=the spectral characteristic $L$ of the light source*spectral characteristic $\lambda 41$ of the rectangular area $P41$*the spectral characteristic of $R$ of the colorimetric unit 30 (16)

$G_{41}$=the spectral characteristic $L$ of the light source*spectral characteristic $\lambda 41$ of the rectangular area $P41$*the spectral characteristic of $G$ of the colorimetric unit 30 (17)

$B_{41}$=the spectral characteristic $L$ of the light source*spectral characteristic $\lambda 41$ of the rectangular area $P41$*the spectral characteristic of $B$ of the colorimetric unit 30 (18)

$R_{51}$ is a value which indicates the component of red light which is reflected in the rectangular area P51, $G_{51}$ is a value which indicates the component of green light which is reflected in the rectangular area P51, and $B_{51}$ is a value which indicates the component of blue light which is reflected in the rectangular area 251. $R_{51}$, $G_{51}$, and $B_{51}$ are acquired using Equations (19) to (21).

$R_{51}$=the spectral characteristic $L$ of the light source*spectral characteristic $\lambda 51$ of the rectangular area $P51$*the spectral characteristic of $R$ of the colorimetric unit 30 (19)

$G_{51}$=the spectral characteristic $L$ of the light source*spectral characteristic $\lambda 51$ of the rectangular area $P51$*the spectral characteristic of $G$ of the colorimetric unit 30 (20)

$B_{51}$=the spectral characteristic $L$ of the light source*spectral characteristic $\lambda 51$ of the rectangular area $P51$*the spectral characteristic of $B$ of the colorimetric unit 30 (21)

In addition, when the calibration process is performed, the quantity of light which is reflected in adjacent rectangular areas in the circumferential direction of the rectangular areas of the color chart 100 and the quantity of light which is reflected in adjacent rectangular areas in the axial direction of the calibration roller 11 in the rectangular areas of the color chart 100 may be corrected using the spectral characteristics and the correction coefficients.

Modification Example

Hereinbefore, the exemplary embodiments of the present invention have been described. However, the present invention is not limited to the above-described exemplary embodiments and may be realized in other various forms. For example, the present invention may be implemented by modifying the above-described exemplary embodiments as below. Meanwhile, the above-described exemplary embodiments and a modification example below may be combined with each other.

In the above-described exemplary embodiment, the true values of the representative color values of the color chart 100 and the values of image data which are generated in the scanning process are expressed by the representative color values of the CIELAB color space, and a configuration may be made such that the above values are expressed by the representative color values of an XYZ color space.

In the above-described second exemplary embodiment, the configuration is made such that the values of the spectral characteristics are stored for every 10 nm wavelength. However, a configuration is made such that the values are stored for each of other wavelengths, for example, for every 5 nm, 20 nm, or the like. In addition, in the above-described second exemplary embodiment, the configuration is made such that the values of the spectral characteristics are stored in a range of 400 nm to 700 nm. However, a configuration may be made such that the values are stored in a wider range.

In addition, with regard to the spectral characteristics, for example, the spectral characteristics of the color chart are used as reflectance (%). However, the reflectance may be managed with the assumption that 0% is 0 and 100% is 1. In addition, the spectral characteristics of the light sources may be values output by a device which measures the spectral characteristics, or may be standardized with the assumption that the peak value thereof is 1.

In the above-described exemplary embodiment, the incident angles of light which is irradiated from the light sources 121 and 122 onto the recording medium M are the same. However, the incident angle may be different from each other. Further, in addition to the incident angles, the quantities of light may be different. When the quantities of light are different, both the quantities of light may be taken into consideration at a ratio of 1 to 1, or consideration is possible while changing the ratio.

Figure 8:
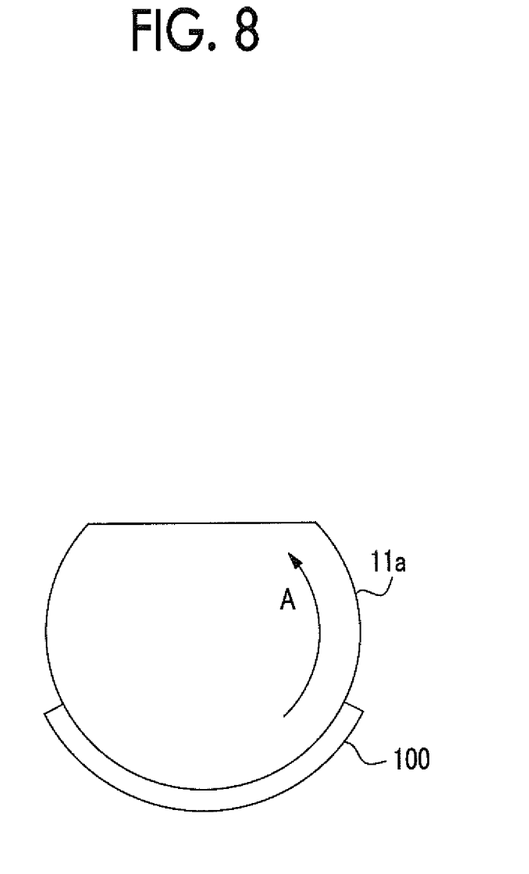
FIG. 8 is a diagram illustrating the configuration of a calibration roller according to a modification example.

In the above-described exemplary embodiment, the calibration roller 11 has a cylindrical shape. However, the shape of the calibration roller 11 is not limited to the cylindrical shape. For example, a pillar shape which has one or more flat surface may be taken into consideration. More specifically, as in the calibration roller 11a illustrated in FIG. 8, a shape acquired by cutting a position, which is separated from the center of a cylinder, along the axial direction may be provided. When the calibration roller lie is used and when the scanning process is performed, the calibration roller 11a is rotated such that a flat portion, which is cut in the axial direction, faces the colorimetric unit 30. According to the configuration, when the recording medium M is fed to the reading position, the recording medium M does not come into contact with the calibration roller 11a.

The above-described image reading device 1 may be built into an image forming apparatus that includes an image forming section which forms an image on the recording medium M, and the image forming apparatus may include a feed section that feeds the recording medium M, on which the image is formed by the image forming section, to the reading position S. In addition, the image reading device 1 may be connected to the image forming apparatus, and the recording medium M, which is fed from the image forming apparatus, may be read by the image reading device 1.

Each of the functions which are realized according to the above-described exemplary embodiments and the modification example may be realized by one or more hardware circuits, may be realized in such a way that a CPU executes one or more programs, or may be realized through the combination thereof. When the above-described functions are realized using a program, the program may be provided in a state in which the program is stored in a computer-readable recording medium, such as a magnetic recording medium (a magnetic tape, a magnetic disk (a Hard Disk Drive (HDD), a Flexible Disk (FD), or the like), an optical recording medium (an optical disk or the like), a magneto-optical recording medium, and a semiconductor memory, or may be distributed through a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
an irradiation section that irradiates a reading position with light;
a color chart that includes a plurality of color patches, and that is provided on a curved surface of a rotatable roller;
an image capturing section that captures an image of the color chart at the reading position, and that outputs image signals which express the captured image;
a correction section that corrects the image signals using a correction coefficient corresponding to the curved surface; and
a calibration section that performs calibration using the image signals, which are corrected by the correction section, and representative color values of the plurality of color patches, the representative color values being stored in advance.

2. The image reading device according to claim 1, wherein the correction coefficient is dependent on a curvature of the curved surface.

3. The image reading device according to claim 2, wherein the correction coefficient is a value that becomes large as a radius of the roller becomes small.

4. The image reading device according to claim 1, wherein the correction section corrects values, each value represents the image signal at a focal point of an imaging region of each of the plurality of color patches captured by the image capturing section, using the correction coefficient.

5. The image reading device according to claim 1, wherein the light is irradiated to a color patch of the color chart at the reading position and color patches in vicinity of the color patch at the reading position, and
wherein the correction section corrects the image signal corresponding to the color patch at the reading position according to a color of the color patch at the reading position and colors of the color patches in the vicinity of the color patch at the reading position.

6. The image reading device according to claim 4, wherein the correction section corrects the image signal corresponding to the color patch at the reading position according to a color of the color patch at the reading position and colors of the color patches in a circumferential direction of the roller with regard to the color patch at the reading position.

7. The image reading device according to claim 4, wherein the correction section corrects the image signal corresponding to the color patch at the reading position according to colors of the color patch at the reading position and the color patches in an axial direction of the roller with regard to the color patch at the reading position.

8. An image forming apparatus comprising:
the image reading device according to claim 1;
an image forming section that forms an image on a recording medium; and
a feed section that feeds the recording medium, on which the image is formed by the image forming section, to the reading position.

9. An image forming apparatus comprising:
the image reading device according to claim 2;
an image forming section that forms an image on a recording medium; and
a feed section that feeds the recording medium, on which the image is formed by the image forming section, to the reading position.

* * * * *